(12) United States Patent
Rai et al.

(10) Patent No.: US 8,159,961 B1
(45) Date of Patent: Apr. 17, 2012

(54) LOAD BALANCING UTILIZING ADAPTIVE THRESHOLDING

(75) Inventors: Vivek Rai, Amsterdam (NL); Dan Mihai Dumitriu, Hopewell, NJ (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 643 days.

(21) Appl. No.: 11/694,667

(22) Filed: Mar. 30, 2007

(51) Int. Cl.
*H04L 12/56* (2006.01)

(52) U.S. Cl. .......................... 370/252; 370/401; 370/412

(58) Field of Classification Search .................. None
See application file for complete search history.

(56) References Cited

U.S. PATENT DOCUMENTS

| | | | |
|---|---|---|---|
| 5,325,464 A | 6/1994 | Pechanek et al. | |
| 5,742,762 A | 4/1998 | Scholl et al. | |
| 5,944,782 A | 8/1999 | Noble et al. | |
| 6,061,722 A | 5/2000 | Lipa et al. | |
| 6,134,244 A | 10/2000 | Van Renesse | |
| 6,185,619 B1 | 2/2001 | Joffe et al. | |
| 6,370,580 B2 | 4/2002 | Kriegsman | |
| 6,411,967 B1 | 6/2002 | Van Renesse | |
| 6,484,204 B1 | 11/2002 | Rabinovich | |
| 6,505,254 B1 | 1/2003 | Johnson et al. | |
| 6,529,953 B1 | 3/2003 | Van Renesse | |
| 6,560,717 B1 | 5/2003 | Joffe et al. | |
| 6,629,149 B1 | 9/2003 | Fraser et al. | |
| 6,724,770 B1 | 4/2004 | Van Renesse | |
| 6,760,775 B1 | 7/2004 | Anerousis et al. | |
| 6,915,329 B2 | 7/2005 | Kriegsman | |
| 7,047,315 B1 | 5/2006 | Srivastava | |
| 7,062,556 B1* | 6/2006 | Chen et al. | 709/226 |
| 7,240,100 B1 | 7/2007 | Wein et al. | |
| 7,519,734 B1 | 4/2009 | Dumitriu et al. | |
| 2003/0187931 A1* | 10/2003 | Olsen et al. | 709/205 |
| 2003/0200277 A1* | 10/2003 | Kim | 709/217 |
| 2006/0069780 A1* | 3/2006 | Batni et al. | 709/226 |
| 2006/0212873 A1* | 9/2006 | Takahisa | 718/105 |
| 2007/0143460 A1 | 6/2007 | Ben-David et al. | |
| 2008/0025230 A1* | 1/2008 | Patel et al. | 370/252 |

(Continued)

OTHER PUBLICATIONS

Abley, J., Hierarchical Anycast for Global Service Distribution, ISC, Inc. <http://www.isc.org/pubs/tn/?tn=isc-tn-2003-1.html> [retrieved Jul. 10, 2007], copyright 2003, p. 7.

(Continued)

*Primary Examiner* — Chirag Shah
*Assistant Examiner* — Daniel Mitchell
(74) *Attorney, Agent, or Firm* — Knobbe Martens Olson & Bear LLP

(57) ABSTRACT

A method and a system for processing data requests in a client-server computing environment, such as the Web, are disclosed. A client device initially transmits a data request to a randomly selected first server device. The first server device may reject the data request if its request queue threshold is exceeded. The client device retransmits the data request, including the request queue threshold, to a randomly selected second server device. The second server device may reject the data request if the request queue threshold of the first server device is smaller than a request queue threshold of the second server device. The client device transmits the data request back to the first server device, including the request queue threshold of the second server device. The first server device processes the data request and adjusts its request queue threshold based on the request queue thresholds of the first and the second server devices.

38 Claims, 7 Drawing Sheets

U.S. PATENT DOCUMENTS

2008/0049616 A1* 2/2008 Kamath et al. ............... 370/235

OTHER PUBLICATIONS

Adler, M., et al., Parallel Randomized Load Balancing (Preliminary Version), Proceedings of the 27th Annual ACM Symposium on Theory of Computing, May 29-Jun. 1, 1995, pp. 238-247, Las Vegas, Nevada, U.S.

Andersen, D., et al., Resilient Overlay Networks, Proceedings of the 18th ACM Symposium on Operating Systems Principles, Oct. 21-24, 2001, pp. 131-145, Banff, Canada.

Azar, Y., et al., Balanced Allocations, SIAM Journal on Computing, Feb. 2000, vol. 29, Issue 1, pp. 180-200.

Baryshnikov, Y., et al., Predictability of Web-Server Traffic Congestion, Proceedings of the 10th IEEE International Workshop on Web Content Caching and Distribution, Sep. 12-13, 200, Sophia Antipolis, France.

Castro, M., et al., Scalable Application-Level Anycast for Highly Dynamic Groups, Proceedings of the 5th COST264 International Workshop on Networked Group Communications, Sep. 16-19, 200, pp. 47-57, Munich, Germany.

Castro., M., et al., One ring to Rule Them All: Service Discovery and Binding in Structured Peer-to-Peer Overlay Networks, Proceedings of the 10th ACM SIGOPS European Workshop, Sep. 22-25, 200, pp. 140-145, Saint-Emilion, France.

Dahlin, M. Interpreting Stale Load Information, Proceedings of the 19th IEEE International Conference on Distributed Computing Systems, May 31-Jun. 4, 1999, pp. 285-296, Austin, Texas.

Dilley, J., et al., Globally Distributed Content Delivery, IEEE Internet Computing, Sep.-Oct. 2002, vol. 6, Issue 5, pp. 50-58.

Eager, D.L., et al., Adaptive Load Sharing in Homogeneous Distributed Systems, IEEE Transactions on Software Engineering, May 1986, vol. 12, Issue 5, pp. 662-675.

Engel, R., et al., Using IP Anycast for Load Distribution and Server Location, Proceedings of the Third IEEE Global Internet Mini-Conference at the Global Telecommunications Conference, Nov. 8-12, 1998, p. 9, Sydney, Australia.

Engelschall, R.S., Load Balancing Your Web Site: Practical Approaches for Distributing HTTP Traffic, New Architect <http://www.webtechniques.com/archives/1998/05/engelschall/> [retrieved Jul. 10, 2007], May 1998, p. 8.

Hardie, T. (ed.), Distributing Authoritative Name Servers Via Shared Unicast Addresses, Internet Informational RFC 3258 <http://www.ietf.org/rfc/rfc3258.txt> [retrieved Jul. 10, 2007], Apr. 2002, p. 11.

Jung, J., et al., Flash Crowds and Denial of Service Attacks: Characterization and Implications for CDNS and Web Sites, Proceedings of the 11th International Conference on World Wide Web, May 7-11, 2002, pp. 293-304, Honolulu, Hawaii, U.S.

Karbhari, P., et al., ACDN: A Content Delivery Network for Applications, Proceedings of the ACM SIGMOD [Special Interest Group on the Management of Date] International Conference on Management of Data, Jun. 4-6, 2002, p. 619, Madison, Wisconsin, U.S.

Kristoff, J.T., Anycast Addressing on the Internet, Kuro5hin.org, <http://aharp.ittns.northwestern.edu/papers/k5-anycast/index.html> [retrieved Jul. 10, 2007], Jan. 2, 2004, p. 7 pages.

Mirchandaney, R. et al., Adaptive Load Sharing in Heterogeneous Dustributed Systems, Journal of Parallel and Distributed Computing, 1990, vol. 9, Issue 4, pp. 331-346.

Mitzenmacheer, M.D., The Power of Two Choices in Randomized Load Balancing, University of California, Doctoral Dissertation, 1996, pp. 1-116, Berkeley, California, U.S.

Othman, O., and D.C. Schmidt, Optimizing Distributed System Performance Via Adaptive Middleware Load Balancing, Proceedings of the ACM SIGPLAN Workshop on Optimization of Middleware and Distributed Systems, Jun. 28, 2001, p. 9, Snowbird, Utah, U.S.

Redundancy and Load Balancing With Anycast, Ruud.org, <http://bgphints.ruud.org/articles/anycast.html> [retrieved Jul. 10, 2007], Sep. 17, 2003, p. 2.

Rowstron, A., and P. Druschel, Pastry: Scalable, Decentralized Object Location, and Routing for Large-Scale Peer-to-Peer Systems, Proceedings of IFIP/ACM International Conference on Distributed Systems Platforms (Middleware 2001), Nov. 12-16, 2001, pp. 329-350, Heidelberg, Germany.

Sivasubramanian, S., et al., Replication for Web Hosting Systems, ACM Computing Surveys, Sep. 2004, vol. 36, Issue 3, pp. 291-334.

Stoica, I., et al., Chord: A Scalable Peer-to-Peer Lookup Service for Internet Applications, Proceedings of the ACM SIGCOMM Conference, Aug. 2001, pp. 149-160, San Diego, California, U.S.

Van Renesse, R., et al., A Gossip-Style Failure Detection System, Proceedings of IFIP (Middleware 1998), Sep. 15-18, 199, pp. 1-16, The Lake District, United Kingdom.

Van Renesse, R., et al., Astrolabe: A robust and Scalable Technology for Distributed System Monitoring, Management, and Data Mining, ACM Transactions on Computer Systems, May 2003, vol. 21, Issue 2, pp. 164-206.

Van Steen, M., et al., Globe: A Wide-Area Distributed System, IEEE Concurrency, Jan.-Mar. 1999, vol. 7, Issue 1, pp. 70-78.

Wollman, W.V., et al., Plug and Play Server Load Balancing and Global Server Load Balancing for Tactical Networks, The MITRE Corporation, 2003, pp. 1-5, Eatontown, New Jersey, U.S.

Zhang, R., and Y.C. Hu, Anycast in Locality-Aware Peer-to-Peer Overlay Networks, Proceedings of International Workshop on Networked Group Communications and International Workshop on Internet QoS and Charging Technologies, Sep. 16-19, 200, pp. 34-46, Munich, Germany.

Zhao, B., et al., Tapestry: A Resilient Global-Scale Overlay for Service Deployment, IEEE Journal on Selected Areas in Communications, Jan. 2004, vol. 22, Issue 1, pp. 1-15.

Zhou, S., et al., Utopia: A Load Sharing Facility for Large, Heterogeneous Distributed Computer Systems, Software: practice and Experience, Dec. 1993, vol. 23, Issue 12, pp. 1305-1336.

* cited by examiner

LOAD BALANCING UTILIZING ADAPTIVE THRESHOLDING

BACKGROUND

The ubiquity of computers in business, government, and private homes has resulted in availability of massive amounts of information from network-connected sources, such as data stores accessible through communication networks, such as the Internet. In recent years, computer communication and search tools have become widely available to facilitate the location and availability of information to users. Most computer communication and search tools implement a client-server architecture where a user client computer communicates with a remote server computer over a communication network. In order to achieve better system performance and throughput in the client-server architecture, large communication network bandwidths are needed as the number of client computers communicating with server computers increases.

One approach to increasing communication bandwidths relates to employing multiple networked server computers offering the same services. These server computers may be arranged in server farms, in which a single server from the server farm receives and processes a particular request from a client computer. Typically, server farms implement some type of load balancing algorithm to distribute requests from client computers among the multiple servers. Generally described, in a typical client-server computing environment, client devices generally issue requests to server devices for some kind of service and/or processing and the server devices process those requests and return suitable results to the client devices. In an environment where multiple clients send requests to multiple servers, workload distribution among the servers significantly affects the quality of service that the client devices receive from the servers. In many modern client-server environments, client devices number in the hundreds of thousands or millions, while the servers number in the hundreds or thousands. In such environments server load balancing becomes particularly important to system performance.

One approach to increase the effectiveness of load balancing and the resulting system performance and throughput, is to efficiently find the servers which have lower load levels than other servers, and assign new client requests to these servers. Finding and distributing workload to overloaded and under-utilized servers may be done in a central or a distributed manner. Central control of load balancing requires a dedicated controller, such as a master server, to keep track of all servers and their respective loads at all times, incurring certain administrative costs associated with keeping lists of servers and connections up-to-date. Additionally, such a master server constitutes a single point of failure in the system, requiring multiple mirrored master servers for more reliable operation. Still further, the reliability and scalability of the number of servers in the server farm can be dependent on the ability and efficiency of the dedicated controller to handle the increased number of servers.

Other approaches to finding and distributing workloads in a multi-server environment exist that relate to distributed, software-based approaches in which the client computers implement some type of load balancing software components. In one such approach, the client computer randomly selects a server. For example, a pseudo-random number generator may be utilized to select one of N servers. However, random selection of servers does not take the actual server loads into consideration and, thus, cannot avoid occasionally loading a particular server. Random server selection algorithms improve the average performance for request handling. This means such algorithms improve request handling for about 50% of the requests, but not for the majority of the requests. In another approach, the client computing device can implement a weighted probability selection algorithm in which the selection of a server is determined, at least in part, on the reported load/resources of each server. This approach must contend with the problem of information distribution among client devices. That is, server load information must be updated periodically at each client device to make optimal server selection based on server loads. The server load may be indicated by a length of a request queue at each server, a request processing latency, or other similar indicators. In yet another approach, a round-robin algorithm for server assignment may be used where each request is sent to a next server according to a number indicated by a counter maintained at the client device. Although simple to implement, this approach does not distribute the load optimally among servers because the round-robin cycle in different clients could coincide, causing multiple clients to call the same server at the same time. In yet another approach, servers may be assigned to individual clients on a priority basis. For example, a client may be assigned a number of servers according to a prioritized list of servers where the client sends a request to the server with the highest priority first, and next re-sends the request to the server with the next highest priority, if needed, and so on. As noted above, each of these approaches for server load distribution suffer from a particular problem that make server selection and load distribution sub-optimal, causing low levels of performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the invention a computer-implemented method for processing data requests is provided that includes obtaining a data request for a document and/or service available from a server, such as a Web server. A first request queue threshold, associated with a first server, and a second request queue threshold, associated with a second server, are compared to determine whether to process the data request. Based on the comparison of the two thresholds, the first request queue threshold is increased and the data request is processed.

According to another aspect of the invention, a system for load balancing is provided including a first server, coupled with a network, for obtaining and processing a data request. A first data store coupled with the first server is provided for storing information associated with the data request. The system includes a second server, coupled with the network, for obtaining and processing the data request. A second data store coupled with the second server is also provided for storing information associated with the data request. The system also includes a first request queue associated with the first server, having a first threshold and a second request queue associated with the second server, having a second threshold. The first server increases the first threshold processes the data request based on a comparison of the first threshold and the second threshold.

According to yet another aspect of the invention, a system for load balancing is provided including a client component operating within a client computing device for transmitting a data request to a server. The system includes a first server, coupled with a network, for obtaining and processing a data request. A first data store coupled with the first server is provided for storing information associated with the data request. The system includes a second server, coupled with the network, for obtaining and processing the data request. A second data store coupled with the second server is also provided for storing information associated with the data request. The system also includes a first request queue associated with the first server, having a first threshold and a second request queue associated with the second server, having a second threshold. The first server increases the first threshold and processes the data request based on a comparison of the first threshold and the second threshold.

According to yet another aspect of the invention, a computer-implemented method for processing data requests including transmitting a first data request to a first server computing device is provided. The first data request is rejected if a first request queue threshold associated with the first server computing device is exceeded. A second data request is formed by adding the first request queue threshold to the first data request, and transmitting the second data request to a second server computing device. The second data request is also rejected if a second request queue threshold associated with the second server computing device is greater than the first request queue threshold included in the second data request. A third data request is then formed, by adding the second request queue threshold to the first data request, and transmitted to the first server computing device.

Other aspects and advantages of the present invention will become apparent from the detailed description that follows including the use of adaptive thresholds for balancing server loads.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
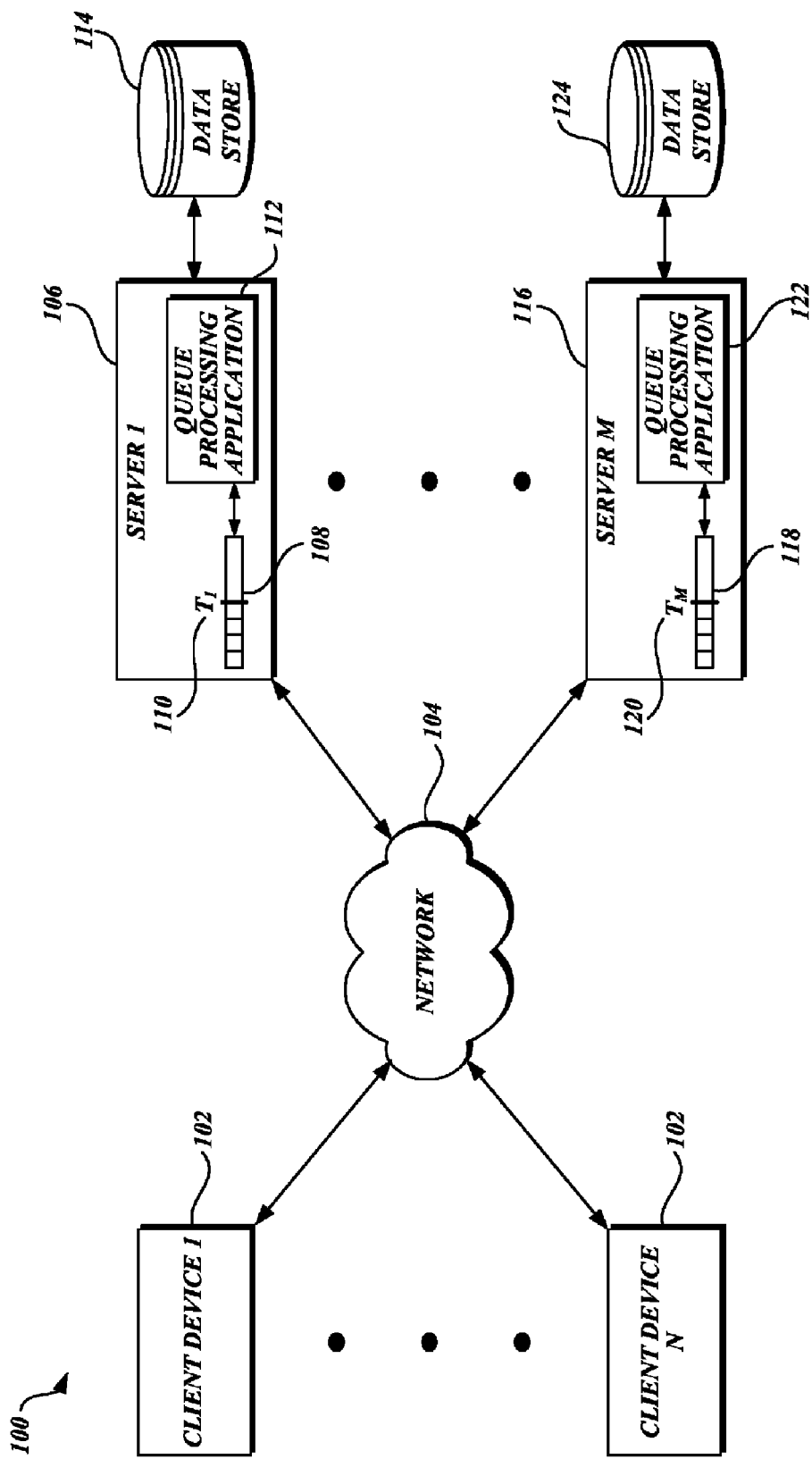
FIG. 1 is a block diagram depicting an illustrative client-server operating environment suitable for distributed load balancing, including a number of client devices and a number of server devices having a client request queue.

Generally described, the invention relates to load balancing in a client-server computing environment. Specifically, the invention relates to the balancing of server load using distributed routing of client requests. In accordance with an embodiment of the invention, a client device initially transmits a data request to a selected first server device using any one of a variety of methods for selecting the server. The first server device processes the request and may reject the data request if its request queue threshold is exceeded. On rejection, the first server device includes its request queue threshold in a rejection message to the client device. The client device retransmits the data request, including the request queue threshold, to a second server device, selected in a similar manner. The second server device may reject the data request if the request queue threshold of the first server device is smaller than a request queue threshold of the second server device. In a second rejection message to the client device, the second server device includes its request queue threshold. The client device transmits the data request back to the first server device, including the request queue threshold of the second server device. The first server device processes the data request and adjusts its request queue threshold based on the request queue threshold of the first and the second server devices.

The following detailed description describes illustrative embodiments of the invention. Although specific operating environments, system configurations, user interfaces, and flow diagrams may be illustrated and/or described, it should be understood that the examples provided are not exhaustive and do not limit the invention to the precise forms and embodiments disclosed. Persons skilled in the field of computer programming will recognize that the components and process elements described herein may be interchangeable with other components or elements or combinations of components or elements and still achieve the benefits and advantages of the invention. Although the present description may refer to the Internet, persons skilled in the art will recognize that other network environments that include local area networks, wide area networks, and/or wired or wireless networks, as well as standalone computing environments, such as personal computers, may also be suitable. In addition, although the below description describes a client-server architecture, those skilled in the art will recognize that the invention may be implemented in a peer-to-peer network as well.

Prior to discussing the details of the invention, it will be appreciated by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following descriptions, numerous specific details are set forth in order to provide a thorough understanding of the invention. However, it will be apparent to one skilled in the art that the invention may be practiced without some or all of these specific details. In other instances, well-known process elements have not been described in detail in order not to unnecessarily obscure the invention.

FIG. 1 is a block diagram depicting a sample client-server operating environment 100 suitable for distributed load balancing. Client devices 102 are coupled to server devices 106 via a network 102. In one illustrative embodiment, the network 104 is the Internet and the client devices 102 communicate with the sever devices 106 via Web protocols such as the HTTP (Hyper Text Transport Protocol). In this embodiment, the servers 106 may be Web servers arranged in a server farm accessible through the same URI (Uniform Resource Identifier). In a Web environment, the client devices 102 generally search for documents using a query statement and the server devices 106 find documents that match the query and return Web pages to the client devices 102, which are displayed in a Web browser on the client device 102. In another illustrative embodiment, for example, in a corporate environment, the network 104 may be a LAN. The servers 106 may offer a number of services to the client devices 102, such as FTP (File Transfer Protocol), database access services, file access services, application services, etc. In one embodiment, the client request may be for data, such as Web pages, to be returned to the client 102 by the server 106. In another embodiment, the client request may indicate a request to perform some process or task at the server 106, such as a registration or a data update at the server 106, without returning any data. In all cases, however, the server 106 processes the request from the client 102. Client devices may include, but are not limited to, a personal computer, a personal digital assistant (PDA), a mobile phone device, etc. In one illustrative embodiment, the client device 102 may include an independent component for interacting with the queue processing application 112 for routing requests. In another illustrative embodiment, the client device 102 may include a software component, integrated with another software component running on the client device 102, for interacting with the queue processing application 112 for routing requests. For example, the client device 102 may include a plug-in component integrated with a Web browser running on the client device 102. Such plug-in component may be specifically used for interactions with the queue processing application 112.

With continued reference to FIG. 1, the server device 106 may include a server queue 108 having a queue threshold 110 and a queue processing application 112. In one illustrative embodiment, the queue processing application 112 may be an independent software component and determines whether accepting the request causes the length of the server queue 108 to exceed the queue threshold 110. In another illustrative embodiment, the queue processing application 112 may be an integral part of another application, such as a search engine, running on the server device 106. In one embodiment, the documents queried may be stored in a data store 114. Data store 114 may be local, such as a disk drive or disk farm, or may be remote such as a remote database.

In an illustrative embodiment, the client-server environment comprises client computing devices and server computing devices coupled together through the Internet. In another illustrative embodiment, the client-server environment comprises client computing devices and server computing devices coupled together through a local area network (LAN) such as Ethernet. In yet another illustrative embodiment, the clients and servers may be virtual applications running on the same physical machine. Those skilled in the art will appreciate that the client and server components may take other forms comprising any combination of hardware and software without departing from the essence of a client-server architecture including requests from client components and processing of those requests by the server components.

Although the above descriptions and the detailed descriptions that follow may refer to a single client and two servers, it will be appreciated by those skilled in the art that the present invention is not limited to a single client or two servers, but is equally applicable to any number of client and server machines/components. Additionally, even though the following descriptions may refer to the Web and Web-based protocols, those skilled in the art will appreciate that the techniques and systems described are equally applicable to other kinds of computing environments, such as LANs and multiple virtual servers embodied in a single machine. Still further, although the present invention will be described with regard to network-based client-server communications, the present invention may be applicable to either network-based client-severs, virtual client-severs or a combination thereof.

Figure 2A:
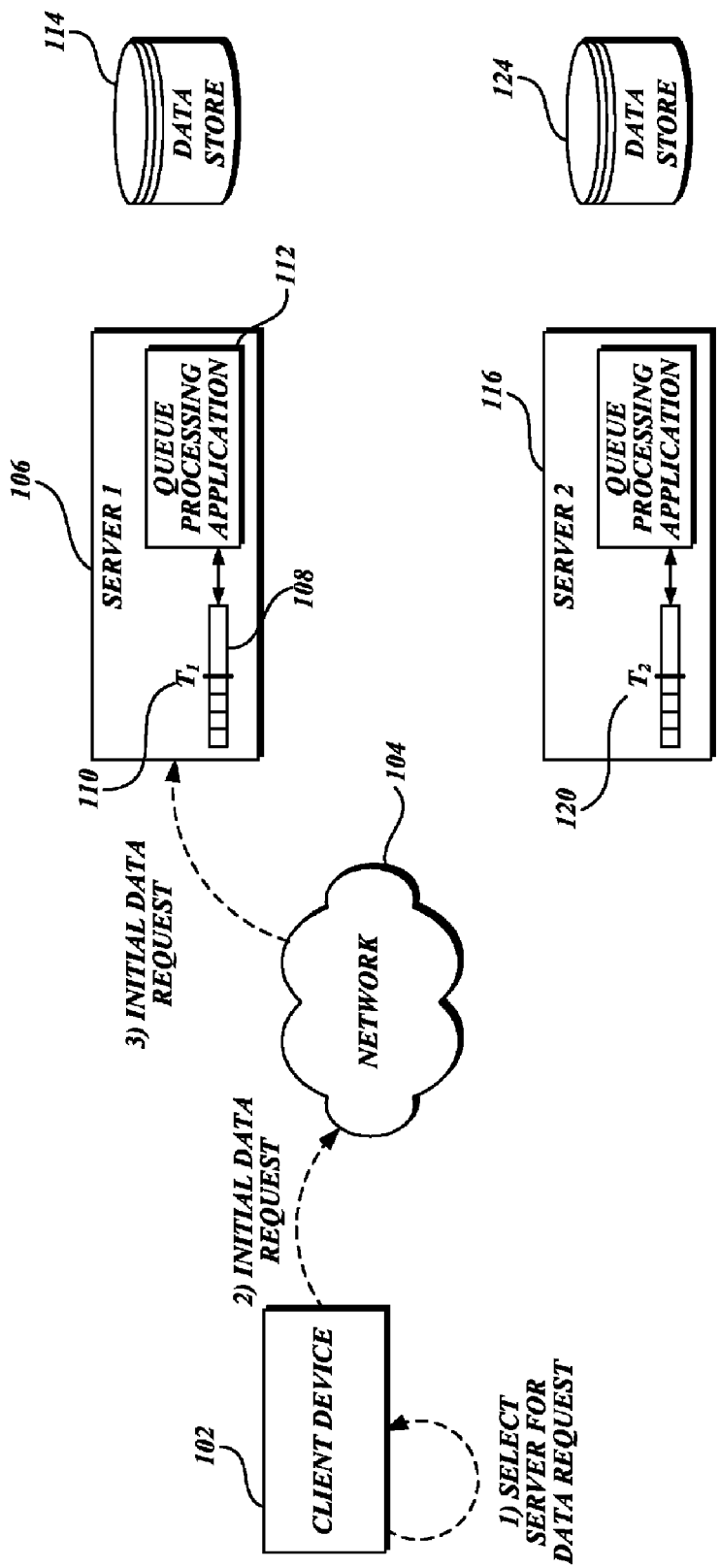
FIG. 2A is a block diagram of the client-server operating environment of FIG. 1 illustrating the initiation of a request from a client device to a first server computing device.

FIGS. 2A-2E illustrate distributed request routing in the client-server operating environment of FIG. 1. With reference to FIG. 2A, when a request arrives from the client device 102, the request is queued in the server queue 108 subject to the threshold 110, as more fully described below. In one illustrative embodiment, the server queue 108 comprises fixed-size cells for storing fixed-size requests. In another embodiment, the server queue 108 comprises an array of pointers to requests. In yet another embodiment, the server queue 108 comprises an indexed table. In yet another embodiment, the server queue 108 comprises a linked-list data structure. Those skilled in the art will appreciate that a queue may be implemented in many other ways while still maintaining the essential properties of a queue data structure. The queue processing application 112 takes the requests from the head of the server queue 108 and processes each request, possibly using data stored in data store 114. Depending on the request, the server device 106 may return some data to the client device 102. In some cases the data returned to the client 102 may be an acknowledgement that the request has been processed. The requests from the clients 102 may be routed to any one of the multiple servers 106, which offer the same services based on the same data and information stored in corresponding data stores 114. In one illustrative embodiment, the data stores 114 coupled with the corresponding server device 106 include the same data synchronized periodically to stay consistent. In another illustrative embodiment, the multiple servers 106 may be coupled to the same data store 114. In one illustrative embodiment, the data store 114 comprises a search index suitable for use by search engines. In another illustrative embodiment, the data store 114 may be a local or remote database. In yet another illustrative embodiment, the data store 114 may be a file server or an application server. The routing of client requests to the servers is based on a distributed request routing algorithm with adaptive thresholding for dynamically adjusting the server queue thresholds 110 for each server device 106. As noted above, in a distributed request routing algorithm, no central control system exists for request routing. Rather, the request routing algorithm is implemented using all clients and servers in a cooperative and distributed manner, as more fully described below.

The queue threshold 110 is used by each respective server device 106 to determine whether to accept a request sent by a client 102 for service. The queue processing application 112 compares the current queue load with the queue threshold 110. If, upon processing the request, the queue threshold 110 is exceeded, then the request is rejected, otherwise, the request is accepted for further processing by the server device 106. In one illustrative embodiment, to route a request, the client device 102 selects a first server device 106 using any of a variety of methods for selecting the server. As described above, the selection methods can include random selection, probabilistic selection, weighted probabilistic server selection, server assignment, and the like. For example, in a weighted probabilistic server selection algorithm, a probability of selection to each server device 106 based on a server load is calculated based on reported server loads/resources. The probability is inversely proportional to the server load. So, the server assigned the highest probability is the server with the lightest load. In one embodiment, the server load is characterized by a length of the server queue 108. The longer the length of the server queue 108, the more load the server device 106 has. In this embodiment, the server with the shortest queue length is selected. In another embodiment, server 106 may be selected randomly, for example, using a pseudo-random number generator. In yet another embodiment, the server 106 may be selected according to a pre-assigned order. For example, a prioritized list of servers may be used by each client from which to select the next server for transmission of data requests. In yet another embodiment, the server 106 may be selected according to a round-robin scheme. For purposes of illustration, in one embodiment, if the first server device 106 receives the request and the first queue threshold 110 is exceeded, the server device rejects the request and returns a rejection message to the client device 102. The rejection message includes the first queue threshold 110.

Figure 2B:
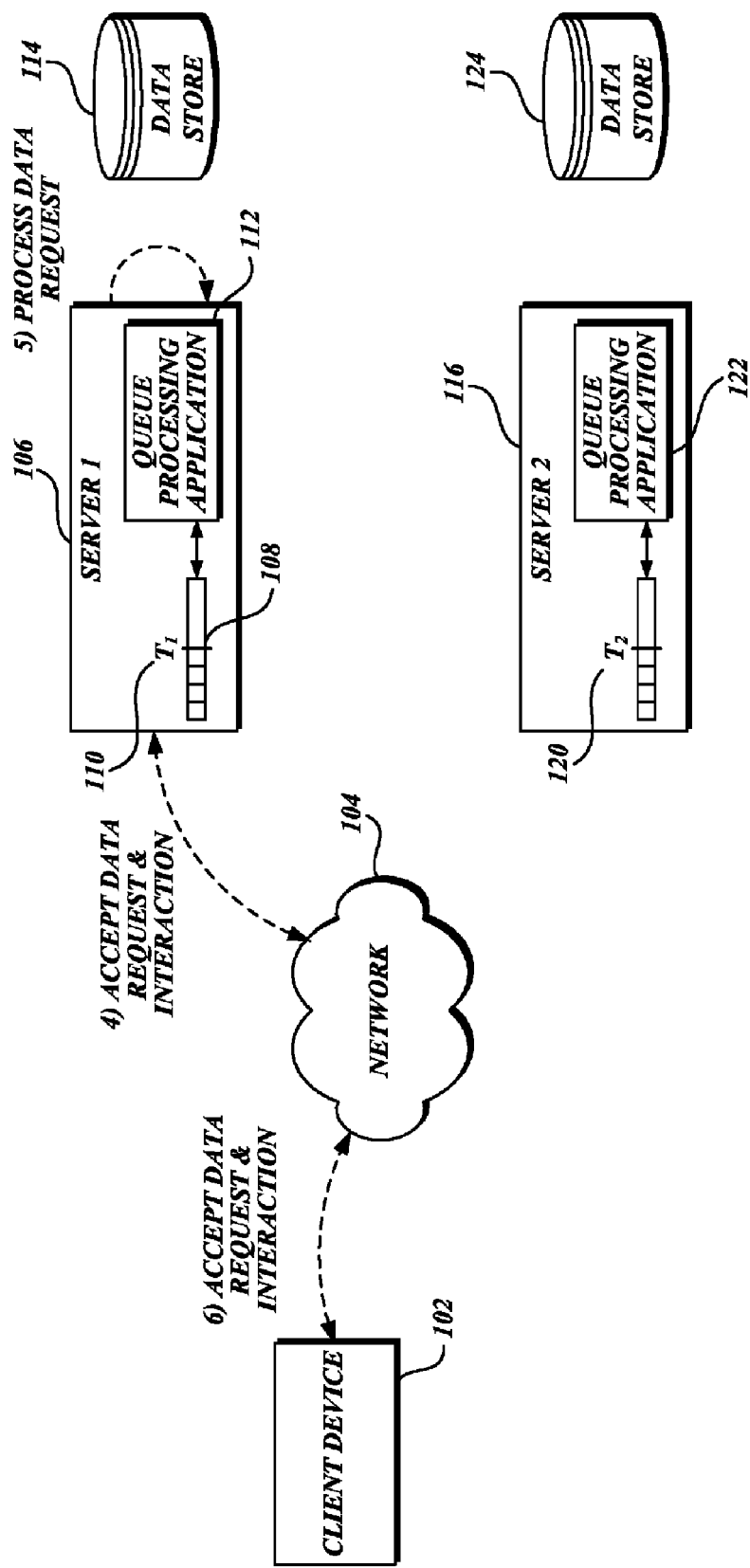
FIG. 2B is a block diagram of the client-server operating environment of FIG. 1 illustrating a first alternative of a first server computing device accepting the request from the client computing device for processing.

With reference now to FIG. 2B, in a first alternative, the server 106 can accept the request from client 102. The acceptance of the request from the client 102 is based on server load as represented by a length of the server queue 108. If the threshold is not exceeded, then the request is accepted by the server 106 for further processing. The client device 102 may be notified of the acceptance of the request. Acceptance of the request by the server 106 includes placing the request at the back of the request queue 108 for later processing by the server 106.

Figure 2C:
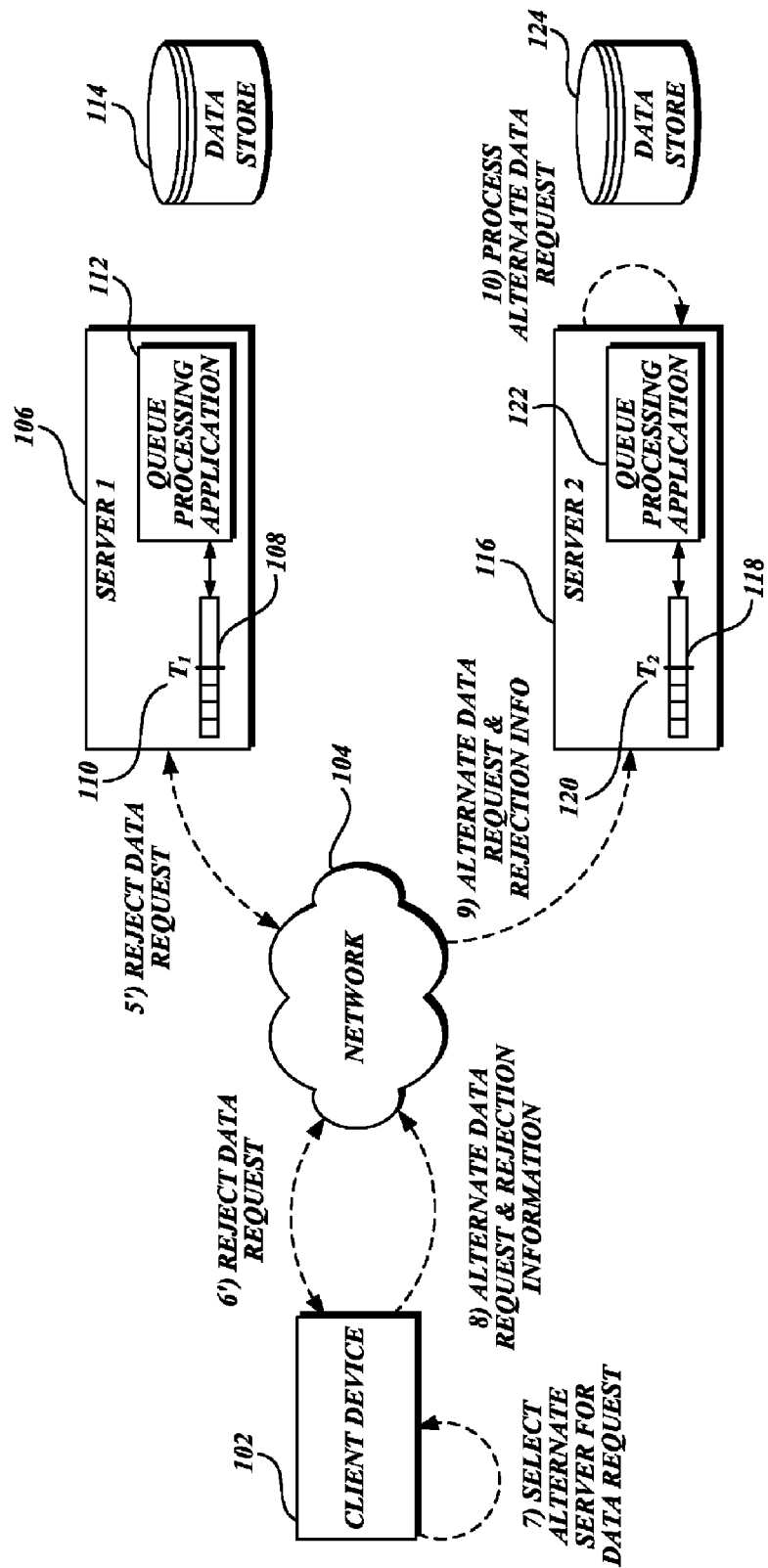
FIG. 2C is a block diagram of the client-server operating environment of FIG. 1 illustrating a second alternative first server computing device rejecting the request from the client computing device and the client computing device sending the request to a second server for processing.

Referring to FIG. 2C, if the server 106 rejects the request, the client device 102 is notified of the rejection via a rejection message through the network 104. In one illustrative embodiment, the first queue threshold 110 of the server queue 108 of the first server 106 is included in the rejection message. In another illustrative embodiment, the rejection message is the request originally sent by the client device 102 with the first queue threshold 110 appended to the request. In another illustrative embodiment, the rejection message may be a simple message including only the first queue threshold 110 and the sever ID of the first server device 106. Those skilled in the art will appreciate that other configurations of rejection messages may be used.

The client device 102 selects a second server to which the request is to be sent. In one illustrative embodiment, the client device 102 includes the first queue threshold 110 in the request sent to the second server device 116. For example, the first queue threshold 110 may be included in a URI as a parameter for the second server 116. The second server 116 receives the request including the first queue threshold 110. The second server device 116 treats the request the same way as did the first server device 106, namely, the queue processing application 122 determines whether accepting the request causes the length of the server queue 118 to exceed a second queue threshold 120.

Figure 2D:
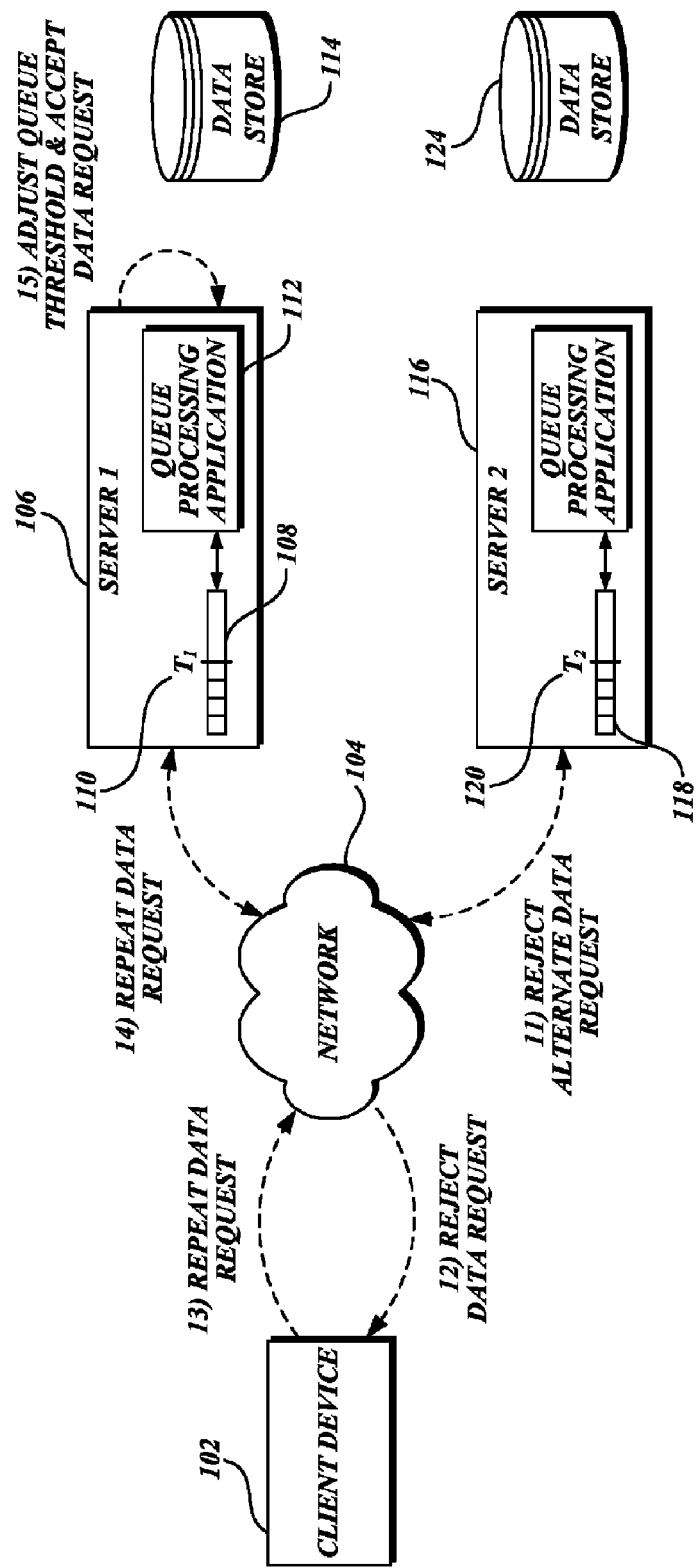
FIG. 2D is a block diagram of the client-server operating environment of FIG. 1 illustrating a first alternative second server computing device rejecting the request from the client computing device and the client computing device resending the request to the first server computing device.

As noted above, the second server 116 may determine that accepting the request will cause the server queue 118 to exceed the corresponding threshold 120. If such determination is made, then the second server 116 compares the first queue threshold 110 with the second queue threshold 120. If the first queue threshold 110 is less than the second queue threshold 120, the second server 116 also rejects the request, as illustrated in FIG. 2D. The second server 116 rejects the request and sends a rejection message to the client device 102, via the network 104, indicating the rejection. The rejection message includes the queue threshold 120 of the second server 116. The client device receives the rejection message and resends the request to the first server device 106. The request resent to the first server device 106 includes the queue threshold 120 of the second server device 116. The first server device 106 receives the resent request and processes the request in a manner similar to the second server device 116, as described with respect to FIG. 2C. At this point, the queue processing application 112 compares the first queue threshold 110 of the first server device 106 to the second queue threshold 120 included in the resent request. The second queue threshold 120 is necessarily greater than the first queue threshold 110 because the same comparison with the same two queue thresholds was done at the second server device 116 resulting in the rejection and resending of the request to the first server device 106. The queue processing application 112 adjusts the first queue threshold 110 to be equal to the second queue threshold 120, equalizing the queue thresholds in the first and the second server devices 106 and 116, respectively.

Figure 2E:
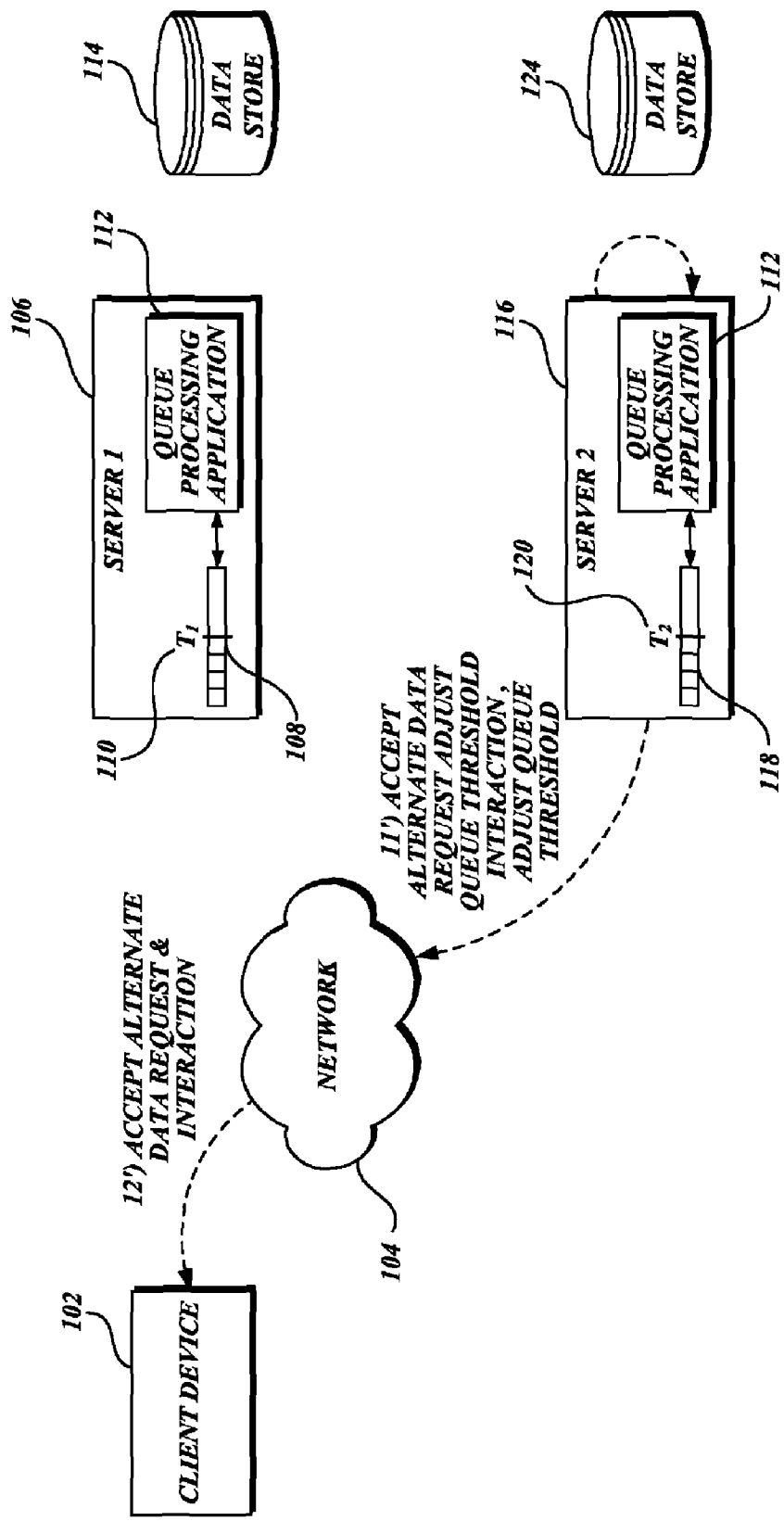
FIG. 2E is a block diagram of the client-server operating environment of FIG. 1 illustrating a second alternative second server computing device accepting the request from the client computing device and adjusting its queue threshold.

As noted above, the request sent to the second server 116 includes the first queue threshold 110. If the first queue threshold 110 is greater than the second queue threshold 120, the second server 116 accepts the request and adjusts the second queue threshold 120 to the same value as the first queue threshold 110, equalizing the two queue thresholds. This way, the queue thresholds are equalized dynamically. Queue threshold equalization provides uniform load distribution across servers 106 and 116 by synchronizing queue thresholds. FIG. 2E is a block diagram of the operating environment of FIG. 1 illustrating the second server computing device accepting the request from the client computing device and adjusting its queue threshold. The second server device 116 accepts the request if the first queue threshold 110 is greater than the second queue threshold 120, and adjusts the second queue threshold 120, as discussed above. In one illustrative embodiment, the second server device 116 processes the request using the data stored in the data store 124. The second server device 116 may also accept the request if the first queue threshold 110 is equal to the second queue threshold 120. In this case, the second queue threshold is increased by a constant amount to enable the second queue 118 to accept the request. The client device 102 is notified of the acceptance of the request by the second server device 116 and continues its interactions, such as receiving results of its request, with the second server device 116.

The distributed request routing algorithm described above can be partly implemented at the server device 106, and partly at the client device 102. The processing of the client requests and adjustment of server queue thresholds 110 is done at the server devices 106 using the threshold data exchanged between the first and the second server devices through the client device 102 via rejection messages and requests.

Figure 3:
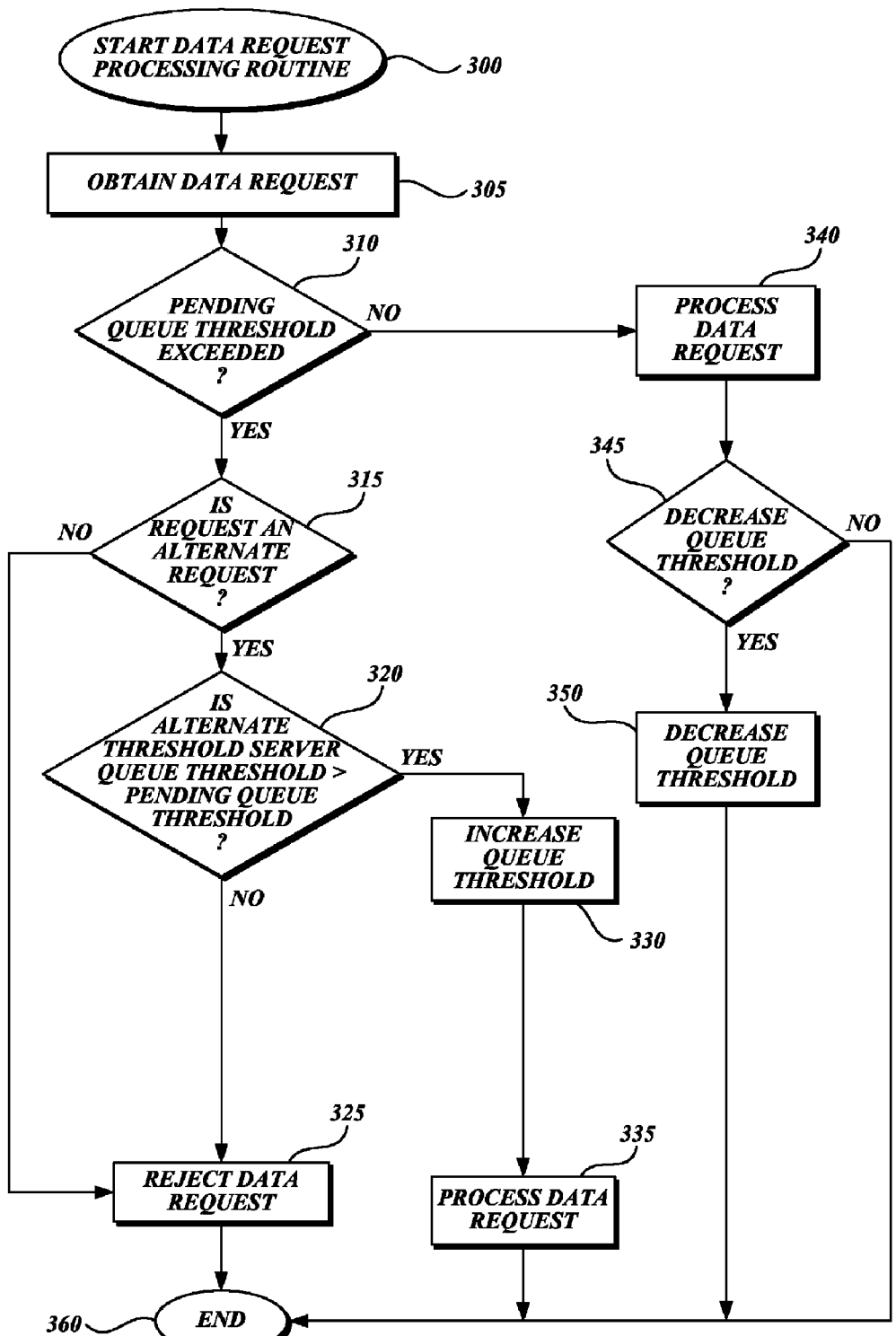
FIG. 3 is a flow diagram depicting an illustrative method for accepting requests and adjusting server computing device queue thresholds.

FIG. 3 is a flow diagram depicting an illustrative method for accepting requests and adjusting server computing device queue thresholds. The request processing routine starts at block 300 and proceeds to block 305 where the server device 106 obtains a request sent from the client device 102. At decision block 310, the queue processing application 112 determines whether adding the request to the server queue 108 causes the pending queue threshold 110 to be exceeded. If it is determined that the pending queue threshold 110 will not be exceeded, the routine proceeds to block 340 where the request is processed by the server device 106. If it is determined that the pending queue threshold 110 will be exceeded by accepting the request, the routine proceeds to decision block 315 where it is determined whether the request is an alternate request rejected by an alternate server device 116 and rerouted by the client device 102 to another sever device 106.

As discussed above, the alternate queue threshold 120 is included in the rerouted request for access by another server device 106. With continued reference to FIG. 3, in one illustrative embodiment, the alternate queue threshold 120 is appended to a URI as a parameter which can be retrieved and used by the queue processing application 112 for queue threshold comparisons. In another illustrative embodiment, the queue threshold 120 may be included in a header field of the request sent by the client device 102. If the request is an alternate request, the routine proceeds to decision box 320 where it is determined whether the alternate queue threshold 120 is greater than or equal to the pending queue threshold 110. If so, at block 330, if the alternate queue threshold 120 is greater than the pending queue threshold 110, the pending queue threshold 110 is set to equal the alternate queue threshold 120. If the alternate queue threshold 120 is equal to the pending queue threshold 110, the pending queue threshold 110 is increased by a constant amount to enable it to accept the request and the request is placed at the back of the pending queue 108. At block 335, the request is processed and the routine terminates at block 360. Back at decision block 320, if it is determined that the alternate queue threshold 120 is less than the pending queue threshold 110, the request is rejected at block 325. The rejection of the request is communicated to the client device 102 by sending a rejection message to the client device 102 including the pending queue threshold 110. As discussed above, after receiving the rejection message, the client device 102 will reroute the request, including the pending queue threshold 110, to another server device selected randomly. At decision block 315, if it is determined that the request is not from an alternate server device 116, the request is rejected at block 325 because accepting the request would cause the pending queue threshold 110 to be exceeded. The routine terminates at block 360.

Returning to block 340, if the pending queue threshold has not been exceeded at decision block 310, the routine 300 proceeds to decision block 345 where it is determined whether to decrease the pending queue threshold 110. As discussed above, smaller queue lengths result in less request processing delay and increased overall system performance. Decreasing queue threshold decreases the average queue length. The determination to decrease the pending queue threshold 110 is based on the length of the pending queue 108. In one illustrative embodiment, the queue processing application 112 continuously polls the length of the pending queue 108 to determine whether the length is less than a predetermined fraction of the pending queue threshold 110. If so, then the pending queue threshold 110 is decreased. In one illustrative embodiment, the pending queue threshold 110 is reduced by a fixed amount. In another illustrative embodiment, the pending queue threshold 110 is reduced by an amount which is a percentage of the current value, such as ten percent. In yet another illustrative embodiment, the queue processing application 112 may be notified, via a system message generated by the server device 106, that an event associated with the pending queue length has taken place. The event may be specified based on the queue length being less than the pending queue threshold 110 for a predetermined length of time or a predetermined number of requests. If it is determined that the pending queue threshold 110 should be decreased, the routine proceeds to block 350 where the pending queue threshold 110 is decreased by an appropriate amount, as discussed above and the routine terminates at block 360. If it is determined that the pending queue threshold 110 should not be decreased, the routine proceeds to block 360, and the routine 300 terminates at block 360.

Test and simulation results indicate that the embodiments of the present invention improve request handling performance, in a client-server computing environment, at 99.9th percentile for different loads. This means that request handling performance is improved for almost all requests under various load conditions. Such performance improvements are very close to those achieved by hardware-based, central load distribution methods without the drawbacks of such methods discussed above. More specifically, the request handling performance is improved by lowering latency and queue thresholds.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of operating a server computing device to process data requests, the method comprising:
   receiving a first data request from a client computing device at a first server computing device, wherein the first data request includes a second queue threshold obtained from a second server computing device;
   comparing, by the first server computing device, a first queue threshold associated with the first server computing device and the second queue threshold obtained from the second server computing device;
   determining, by the first server computing device, whether to process the data request at the first server computing device based on the comparison of the first queue threshold and the second queue threshold; and
   responsive to a determination not to process the data request at the first server computing device, providing, by the first server computing device, a rejection message to the client computing device, wherein the rejection message includes the first queue threshold, and wherein the client computing device is configured to provide a second data request including the first queue threshold to the second server computing device.

2. The method of claim 1, wherein receiving a first data request comprises receiving the data request from a network.

3. The method of claim 1, wherein the first queue threshold is indicative of a number of data requests that can be placed in a first request queue for processing by the first server computing device before the first server computing device rejects a data request.

4. The method of claim 3, wherein the first request queue is operable to hold a plurality of data requests.

5. The method of claim 1, wherein the second queue threshold is indicative of a number of data requests that can be placed in a second request queue for processing by the second server computing device before the second serving computing device rejects a data request.

6. The method of claim 5, wherein the second request queue is operable to hold a plurality of data requests.

7. The method of claim 1, wherein determining whether to process the data request comprises determining whether the first queue threshold is less than or equal to the second queue threshold.

8. A system for load balancing comprising:
a first server operable to receive and process data requests from client computers, wherein the first server includes a first data store coupled with the first server for storing information associated with a data request and a first request queue including a first queue threshold, the first request queue operable to store a first number of data requests, the first number of data requests being less than the first queue threshold; and
a second server, coupled with a network, operable to receive and process data requests from client computers, wherein the second server includes a second data store coupled with the second server for storing information associated with a data request and a second request queue including a second queue threshold, the second request queue operable to store a second number of data requests, the second number of data requests being less than the second queue threshold;
wherein the first server receives a first data request including the second queue threshold from a client computer, wherein the second queue threshold was included in a first rejection message provided to the client computer by the second server, wherein the first server provides a second rejection message to the client computer responsive to a comparison of the first queue threshold and the second queue threshold included in the data request, and wherein the client computer is configured to send a second data request to the second server including the first queue threshold responsive to receipt of the second rejection message.

9. The system of claim 8, wherein the first server includes a queue processing application operable to manage the first request queue.

10. The system of claim 8, wherein the second server includes a queue processing application operable to manage the second request queue.

11. The system of claim 10, wherein the queue processing application is a stand-alone application.

12. The system of claim 8, wherein the first server increases the first queue threshold to be equal to the second queue threshold if the comparison of the first queue threshold and the second queue threshold indicates that the first queue threshold is less than the second queue threshold.

13. The system of claim 8, wherein the first server increases the first queue threshold by a predetermined amount if the comparison of the first queue threshold and the second queue threshold indicates that the first queue threshold is equal to the second queue threshold.

14. The system of claim 8, wherein the first server processes the first data request if the comparison of the first queue threshold and the second queue threshold indicates that the second queue threshold is greater than the first queue threshold.

15. A system for load balancing comprising:
a first server operable to receive and process data requests from a client computing device, wherein the first server includes a first data store coupled with the first server for storing information associated with a data request and a first request queue including a first queue threshold, the first request queue operable to store a first number of data requests, the first number of data requests being less than the first queue threshold; and
a second server, coupled with a network, operable to receive and process data requests from the client computing device, wherein the second server includes a second data store coupled with the second server for storing information associated with a data request and a second request queue including a second queue threshold, the second request queue operable to store a second number of data requests, the second number of data requests being less than the second queue threshold;
wherein the first server receives a first data request including the second queue threshold from a client computer, wherein the first server provides a first rejection message including the first queue threshold to the client computer responsive to a comparison of the first queue threshold and the second queue threshold included in the data request, and wherein the client computer is configured to send a second data request to the second server including the first queue threshold.

16. The system of claim 15, wherein the client computing device is programmed to select the first server and the second server based on a weighted probability.

17. The system of claim 16, wherein the weighted probability is determined based on a load on the first and second server.

18. The system of claim 17, wherein the load on the first server is determined based on a length of the first request queue.

19. The system of claim 17, wherein the load on the first or second server is determined based on a latency of data request processing.

20. The system of claim 15, wherein the client computing device is programmed to select the first server and the second server based on a random number.

21. The system of claim 15, wherein the client computing device is programmed to select the first server and the second server based on a preassigned server identifier.

22. A system for load balancing comprising:
a data store; and
a first server, coupled with the data store and a network, operable to obtain and process a data request from a client computer, the first server including:
a first request queue having a first queue threshold; and
a queue processing application operable to:
receive a first data request including a second queue threshold from the client computer, wherein the second queue threshold corresponds to a second server, and wherein the second queue threshold is associated with a rejection message received by the client computer from the second server;
process the second queue threshold to compare the first queue threshold and the second queue threshold; and
provide a rejection message including the first queue threshold based on the comparison of the first queue threshold and the second queue threshold, wherein the client computing device provides a second data request to the second server including the first queue threshold responsive to receipt of the rejection message.

23. The system of claim 22, wherein the data store comprises a local database.

24. The system of claim 22, wherein the data store comprises a remote database.

25. The system of claim 22, wherein the first server increases the first queue threshold to be equal to the second queue threshold if the first queue threshold is less than the second queue threshold.

26. The system of claim 22, wherein the first server increases the first queue threshold by a predetermined amount if the first queue threshold is equal to the second queue threshold.

27. The system of claim 22, wherein the first server processes the data request if the second queue threshold is greater than the first queue threshold.

28. A computer-implemented method for processing data requests, the method comprising:
- transmitting a first data request to a first server computing device having a first queue threshold;
- receiving a first rejection message, including the first queue threshold, from the first server computing device if the first queue threshold is exceeded;
- in response to receiving the first rejection message, forming a second data request by adding the first queue threshold to the first data request, and transmitting the second data request to a second server computing device having a second queue threshold;
- receiving a second rejection message, including the second queue threshold, from the second server computing device if the second queue threshold is exceeded and the second queue threshold is greater than the first queue threshold; and
- in response to receiving the second rejection message, forming a third data request by adding the second queue threshold to the first data request, and transmitting the third data request to the first server computing device.

29. The method of claim 28, wherein transmitting a first data request comprises transmitting the first data request using Web protocols.

30. The method of claim 28, wherein the first server computing device is selected randomly.

31. The method of claim 28, wherein the second server computing device is selected randomly.

32. The method of claim 28, wherein the first server computing device is selected based on a weighted probability.

33. The method of claim 32, wherein the weighted probability is determined based on a load on the first server computing device.

34. The method of claim 33, wherein the load on the first server computing device is determined based on a length of a first request queue associated with the first server computing device.

35. The method of claim 33, wherein the load on the first server computing device is determined based on a latency of data request processing by the first server computing device.

36. The method of claim 28, wherein the first server computing device and the second server computing device are selected based on a random number.

37. The method of claim 28, wherein the first server computing device and the second server computing device are selected based on a preassigned server identifier.

38. A non-transitory computer-readable medium having computer-executable components stored thereon, wherein in response to execution, the components cause a computer to process data requests, the components comprising:
- a data request component for providing a first data request to a first server;
- an alternate data request component for providing a second data request to a second server, wherein the second data request specifies a queue threshold of the first server that has previously rejected the first data request,
- wherein the data request component is configured to provide a third data request to the first server responsive to receipt of a rejection message from the second server, wherein the rejection message from the second server is based at least in part on a comparison of the queue threshold of the first server and a queue threshold of the second server, and wherein the third data request includes the queue threshold of the second server.

* * * * *

UNITED STATES PATENT AND TRADEMARK OFFICE
CERTIFICATE OF CORRECTION

| | | |
|---|---|---|
| PATENT NO. | : 8,159,961 B1 | Page 1 of 1 |
| APPLICATION NO. | : 11/694667 | |
| DATED | : April 17, 2012 | |
| INVENTOR(S) | : Rai et al. | |

It is certified that error appears in the above-identified patent and that said Letters Patent is hereby corrected as shown below:

Page 2, Col. 2, (Other Publications), line 7, change "Dustributed" to --Distributed--.

At column 2, lines 61-62, change "processes" to --and processes--.

Signed and Sealed this
Fourteenth Day of August, 2012

David J. Kappos
*Director of the United States Patent and Trademark Office*